(12) United States Patent
Huras et al.

(10) Patent No.: US 7,171,519 B2
(45) Date of Patent: Jan. 30, 2007

(54) SYSTEM, METHOD AND PROGRAM FOR ASSESSING THE ACTIVITY LEVEL OF A DATABASE MANAGEMENT SYSTEM

(75) Inventors: Matthew A. Huras, Ajax (CA); Kevin R. Rose, Toronto (CA); Aamer Sachedina, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 10/788,582

(22) Filed: Feb. 27, 2004

(65) Prior Publication Data

US 2005/0192977 A1 Sep. 1, 2005

(51) Int. Cl.
G06F 11/34 (2006.01)

(52) U.S. Cl. ..................................... 711/118

(58) Field of Classification Search ................ 711/118, 711/154; 707/1
See application file for complete search history.

(56) References Cited

U.S. PATENT DOCUMENTS

| | | | |
|---|---|---|---|
| 5,809,546 A | 9/1998 | Greenstein et al. | 711/164 |
| 5,867,664 A | 2/1999 | Kosugi et al. | 395/200.64 |
| 6,070,202 A | 5/2000 | Minkoff et al. | 710/56 |
| 6,230,220 B1 | 5/2001 | Cohen et al. | 710/52 |
| 6,304,904 B1 | 10/2001 | Sathyanarayan et al. | 709/224 |
| 6,453,269 B1 | 9/2002 | Quernemoen | 702/186 |
| 2002/0035567 A1 | 3/2002 | Shah et al. | 707/101 |
| 2002/0049759 A1 | 4/2002 | Christensen et al. | 707/10 |
| 2002/0116441 A1 | 8/2002 | Ding et al. | 709/105 |
| 2002/0175934 A1 | 11/2002 | Hand et al. | 345/734 |
| 2002/0183972 A1 | 12/2002 | Enck et al. | 702/186 |

OTHER PUBLICATIONS

Kern, M. R.; McBride, G. E.; Shackelford, D. M.; "*Fixed Storage Allocation of Input-Output Buffers*", IBM Technical Disclosure Bulletin V39, No.03-96, pp. 75-76.
Choi, A.; Ruschitzka, M.; "*Managing Locality Sets: The Model and Fixed-Size Buffers*", IEEE Transactions on Computers, vol. 42, No. 2, Feb. 1993, pp. 190-204.
Wallace, R. B.; McKoy, T. E.; "*A Performance Monitoring and Capacity Planning Methodology for Web Servers*".
Giacone, Glynn B.; "*Oracle, Sybase, and Informix: Metrics for Sizing, Planning, Monitoring and Tuning*", BGS Systems.
Stadelmann, M. R.; "*Modeling High-Performance Unix Servers*", BGS Systems, inc.
Osberg, B.; Rice, T.; "Status Calculation, An RDBMS Solution", IEEE Network Magazine, Jul. 1990, pp. 29-34.
Carlile, B.; "Linear Scalability on Decision Support Systems: Cray CS6400", CUG 1995 Fall Proceedings, pp. 61-74.

*Primary Examiner*—Kevin L. Ellis
(74) *Attorney, Agent, or Firm*—Sughrue Mion, PLLC

(57) ABSTRACT

A system and method for assessing the activity level of a database management system. The number of page fix operations performed by execution units of a database management system can be counted and used to compute a measure for the activity level of the database management system. In one embodiment of the invention, multiple counters are used to count the page fix operations. This and other embodiments of the invention facilitate activity level assessment without incurring significant performance penalty.

24 Claims, 6 Drawing Sheets

SYSTEM, METHOD AND PROGRAM FOR ASSESSING THE ACTIVITY LEVEL OF A DATABASE MANAGEMENT SYSTEM

FIELD OF THE INVENTION

The present invention relates generally to database management systems, and more specifically to systems, methods and computer program products for assessing the activity level of such database management systems.

BACKGROUND

Database management systems typically contain features that enable various users to gauge or assess the operational characteristics of such systems. These features are commonly implemented in what are generally referred to as "monitors".

Database Administrators (DBAs) typically use monitors for a variety of tasks. One common usage of monitors is for evaluating the activity level of the database management system. In its simplest sense, this is equivalent to asking "How busy is the system?" The system utilization is an important factor to consider when making a variety of system management decisions. For example, the DBA may wish to identify periods of reduced demand so they may execute non-production utility work (i.e. database backups, statistics collection), which would otherwise negatively impact a production workload. In another scenario, the DBA may be trying to identify the periods of high activity so they can add extra capacity.

To assess database activity, a DBA would typically select from a number of known "monitors". These may include (but are not limited to) transaction rate, a measure of central processing unit (CPU) utilization, and/or input/output [I/O] bandwidth. However, there exist a number of limitations that prevent the selection of most metrics as a singular indicator of database activity. For example, transaction rate is an effective metric for expressing the level of database activity when the workload is transactional in nature. Transactional workloads typically consist of small, simple transactions without substantial variation in the time or resources needed to service any particular transaction. However, the same metric is largely ineffective in decision support environments where there is a large variance in the "size" of transactions. Similarly, the CPU utilization alone would generally be regarded as a poor indicator of activity of an I/O constrained RDBMS. Employing a combination of metrics would typically increase the complexity and decrease the efficiency of RDBMS activity level assessment systems.

Software applications or systems may also benefit from querying the activity level of the database management system. One common class of autonomic system strives to maintain an optimum level of workload performance. Such systems typically operate by continually polling the activity on the system and taking some action when the activity level increases or decreases beyond defined thresholds. Like its human counterpart, the autonomic system is interested in assessing the general activity of the RDBMS. However, the frequency at which the autonomic system queries the level of activity can raise efficiency concerns if the cost of gathering the data used to assess activity level is excessive. To be suitable within an autonomic computing environment, the mechanism for measuring the level of activity should have negligible impact on the performance of the RDBMS.

SUMMARY

The present invention is directed to an improved system and method for assessing the level of activity of a database management system. In accordance with the present invention, the level of activity of a database management system can be assessed without incurring significant performance penalty. This is accomplished generally through the use of a novel metric as an indicator of activity level in an RDBMS, and techniques to measure such activity unobtrusively, thereby providing at least some advantages over known activity level assessment techniques.

In one preferred embodiment of the invention, the metric is used as the sole indicator of activity level of the RDBMS, which is equally effective across a variety of workloads and configurations.

In one broad aspect of the present invention, there is provided a method of assessing the activity level in a database management system, comprising the steps of a method of assessing the activity level of a database management system, comprising the steps of counting the number of page fix operations performed by at least one execution unit of the database management system, and computing an activity measure for the database management system, wherein the activity measure is a function of the number of page fix operations counted at the counting step.

Instructions for performing the steps of a method of assessing the activity level in a database management system in an embodiment of the present invention may be provided on a computer-readable medium.

In another broad aspect of the present invention, there is provided an activity level assessment system for assessing the activity of a database management system, the activity level assessment system comprising at least one control module programmed with instructions which are executable by the database management system, the at least one control module being programmed to count the number of page fix operations performed by at least one execution unit of the database management system and compute an activity measure for the database management system, wherein the activity measure is a function of the number of page fix operations counted.

In yet another broad aspect of the present invention, there is provided a computer program product comprising a computer-readable medium tangibly embodying computer executable code for directing a data processing system to perform a method of assessing the activity level of a database management system, the computer program product further including code for counting the number of page fix operations performed by at least one execution unit of the database management system, and code for computing an activity measure for the database management system, wherein the activity measure is a function of the number of page fix operations counted at the counting step.

BRIEF DESCRIPTION OF THE DRAWINGS

For a better understanding of the present invention and to show more clearly how it may be carried into effect, reference will now be made, by way of example, to the accompanying drawings, which are referenced in the foregoing description to illustrate embodiments of the present invention, and in which.

DETAILED DESCRIPTION OF THE EMBODIMENTS

The following detailed description of the embodiments of the present invention does not limit the implementation of the embodiments to any particular computer programming language. The computer program product may be implemented in any computer programming language provided that the OS (Operating System) provides the facilities that may support the requirements of the computer program product. A preferred embodiment is implemented in the C or C++ computer programming language (or may be implemented in other computer programming languages in conjunction with C/C++). Any limitations presented would be a result of a particular type of operating system, computer programming language, or data processing system and would not be a limitation of the embodiments described herein.

The embodiment of the present invention relates generally to database management systems, and more specifically to systems and methods and computer program product for assessing the activity level in database management systems. The terms "activity" and "activity level" are used interchangeably herein. In the foregoing description, the invention is described with respect to a relational database management system (RDBMS). However, it will be understood by persons skilled in the art that certain features of the embodiment can also be applied to other database management systems.

Figure 1:
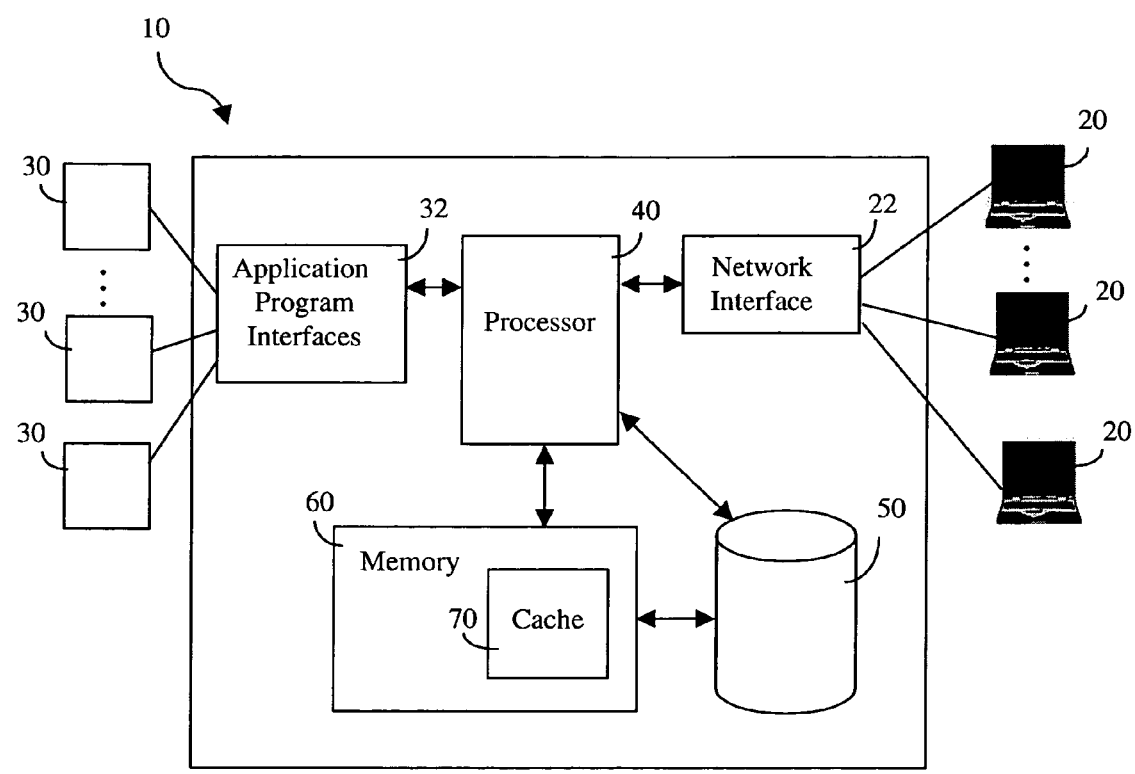
FIG. 1 is a schematic diagram of a typical database management system in one example implementation of the present invention.

Referring to FIG. 1, a schematic diagram of a typical relational database management system is shown generally as 10, in one example implementation. Database systems are available on computing machines of varying sizes. For example, RDBMS 10 is shown in FIG. 1 as a multi-user system, which is generally employed on larger computing machines. In the example implementation shown, multiple users 20 may access RDBMS 10 through a network interface 22. Application programs 30 may also be provided direct access to RDBMS 10 through a set of application program interfaces 32. At least one processor 40 is coupled to network interface 22 and application program interfaces 32 to provide and control access to data in a physical database 50 by users (i.e. users 20 and application programs 30 referred to collectively, in this example).

In the environment of RDBMS 10, numerous software execution units (processes or threads) concurrently perform the work that is necessary to service user requests. The servicing of requests typically involves finding and retrieving data from disk. To improve performance, most RDBMS systems employ a memory cache (e.g. memory cache 70 in memory 60) to reduce the cost of accessing the physical disk. This cache is commonly referred to as a "bufferpool". Higher level components of the RDBMS will typically initiate requests to load the data into the bufferpool from which it will be accessed. These requests will result in the data being loaded from disk if it is not already resident in the bufferpool. These requests are typically expressed in units of fixed sized "pages". A request to ensure that a particular page reside in the bufferpool is commonly referred to as a "page fix".

In accordance with the embodiment, a measure of activity based upon a counted number of page fix operations can be computed. Such a measure can be interpreted as a relative indicator of activity of RDBMS 10. In one preferred embodiment of the invention, the measure is used as the sole indicator of activity level of the RDBMS, which is equally effective across a variety of workloads and configurations.

For example, the measure of activity can be expressed as a "page fix rate" that is computed based on a cumulative count of page fix operations. Both I/O and CPU consumption influence the rate of page fixes; this makes the page fix rate an effective general-purpose indicator of RDBMS activity. The page fix rate is also an effective indicator of RDBMS activity, whether RDBMS 10 is used in a transaction-oriented environment or a decision support environment because servicing either workload generates page requests. In the case of either workload, increasing the intensity of the workload results in an increased rate of page fixes. Accordingly, the page fix rate can be used as a sole indicator of RDBMS activity, which is equally applicable across a variety of workloads and systems.

It will be understood by persons skilled in the art that the components of RDBMS 10 shown in FIG. 1 are provided by way of example only, and that variant implementations of RDBMS 10 can have additional and/or different components without departing from the scope of the embodiment. It will also be understood by persons skilled in the art, that while it has been assumed that the totality of data in RDBMS 10 is stored in a single database for the sake of simplicity, the data may be distributed across multiple distinct databases in variant implementations of RDBMS 10.

Figure 2:
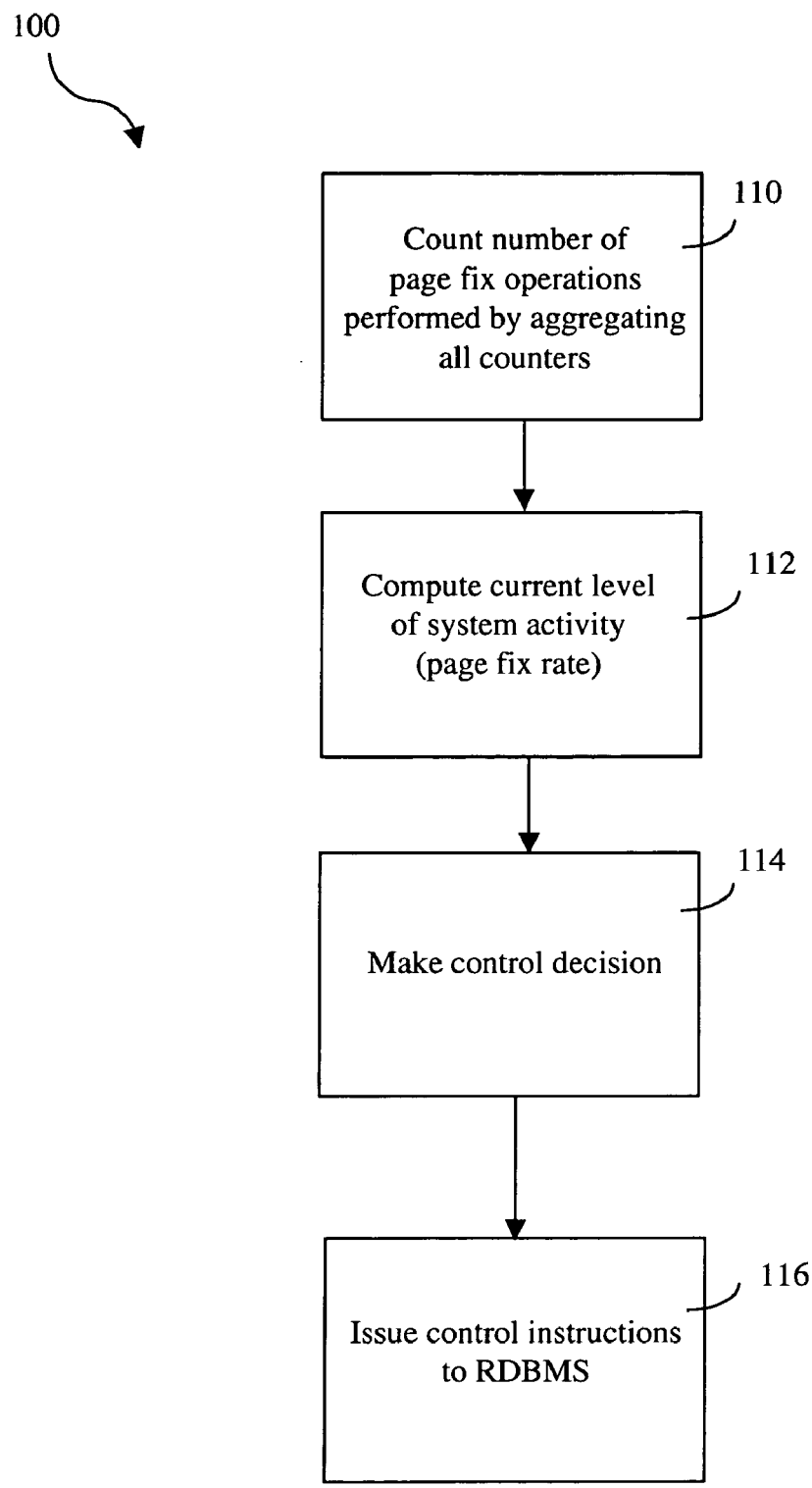
FIG. 2 is a flowchart illustrating steps in a method of assessing activity level in an RDBMS by an autonomic control system in an embodiment of the present invention.

Referring to FIG. 2, a flowchart illustrating steps in a method of assessing activity level of an RDBMS by an autonomic control system in an embodiment of the present invention is shown generally as 100. While method 100 is performed within an autonomic control system in this embodiment of the invention provided by way of example, it will be understood by persons skilled in the art that method 100 can be applied by other types of control systems that are not autonomic in variant embodiments of the invention. These other applications are intended to be within the scope of the embodiment.

At step 110, the number of page fix operations performed is computed by aggregating the value of all counters, where the counters have been incremented in accordance with the embodiment (described in further detail below with reference to the remaining Figures).

At step 112, the current level of system activity (i.e. the page fix rate) is computed. The specific details of the rate calculation, including the frequency of rate calculations for example, are defined by the end user of an implementation of this embodiment, in this case of the autonomic control system. Put another way, the interval at which counter data is used, and the details of how the counter data is used, is determined by the user.

At step 114, an appropriate control decision can be made depending on the page fix rate computed at step 112, and subsequently a corresponding control instructions can be issued to the database management system at step 116. The control decision and corresponding control instructions can be pre-determined, for application by an autonomic control system.

The steps of method 100 may be repeated.

An embodiment in which a plurality of counters are used to maintaining a running count of the total page fix operations performed by RDBMS 10 will now be described with reference to the remaining Figures.

In order to calculate various measures based on page fix operations, a running count of the total page fix operations performed by the RDBMS is maintained. Given this total, various activity measures (e.g. a page fix rate) can be computed in known manner.

One technique for counting the total number of page fix operations utilizes a single, scalar counter, stored in a region of memory (e.g. in a region of memory 60 of FIG. 1) that is accessible to all execution units (EUs). The counter is incremented each time an execution unit performs a page fix operation.

Typically, however, the incrementing of a single counter by multiple execution units will be controlled so that each counter incrementing operation is performed atomically (i.e. the counter incrementing operations are serialized), to prevent lost updates. Lost updates occur on multiprocessor (MP) systems when n execution units increment a counter simultaneously (each increment is by 1), but the total change to the counter is less then n. An excessive number of lost updates causes the total count of page fixes to contain significant error.

Modern computing systems provide many mechanisms for building atomicity of operations, such as semaphores, mutexes, atomic values, etc. However, the use of any of these mechanisms will incur a performance cost. Additionally, whenever an execution unit increments the counter in such a system, all other execution units requiring access to the counter are blocked. Therefore, the performance of a RDBMS utilizing an activity level assessment system in which serialized access is enforced will typically worsen as the scale of the RDBMS (i.e. the number of execution units) increases.

In accordance with an aspect of the embodiment, an alternative is provided that eliminates the cost of serialization, generally resulting in improved performance. Instead of a single, serially-accessed counter, a group of counters in memory are employed, each of which is incremented without serialization. Furthermore, requests by execution units to increment a counter are distributed amongst the counters in the group. Preferably, the increment requests are distributed substantially evenly over all the counters in the group. By using multiple counters and by distributing the increment requests over the counters, the margin of error that might result from incrementing the counters without serialization is minimized. Each counter in this group of counters may also be referred to herein as a "shared counter".

Figure 3:
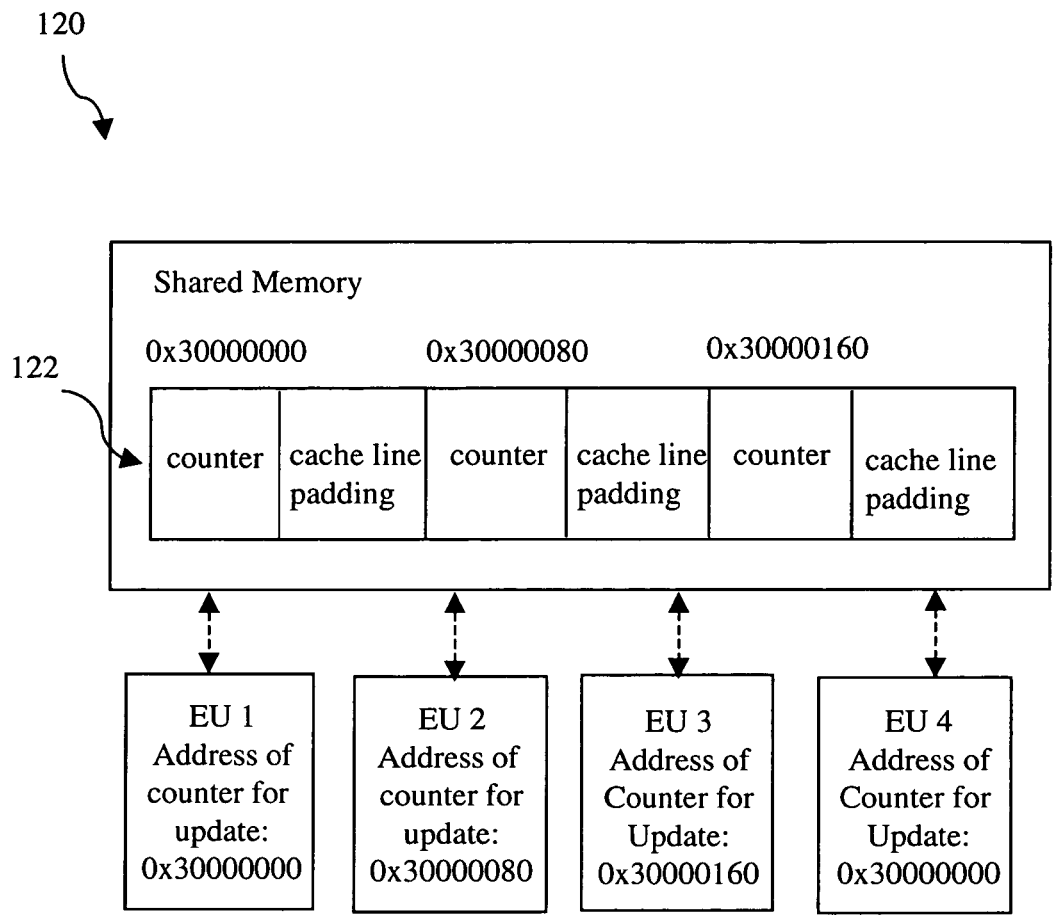
FIG. 3 is a schematic diagram illustrating a portion of memory in which counters are arranged in an embodiment of the present invention.

Referring to FIG. 3, a schematic diagram illustrating a portion of memory in which counters are arranged in an embodiment of the present invention is shown generally as 120. In this embodiment, a buffer 122 containing a number of counters is established in shared memory. The counters reside in shared memory so that they can be accessed by execution units of the RDBMS (e.g. RDBMS 10 of FIG. 1) which perform page fix operations. It is not necessary that the counters be arranged contiguously in memory. On some architectures, where the cost of accessing memory is non-uniform (i.e. NUMA), it is desirable that an execution unit be assigned to a counter which resides in the cheapest region of memory with the least overhead for access. It is assumed that the execution unit that performs aggregation of the counter values will have access to all of the counters.

An algorithm may be used to determine the optimum number of counters for the RDBMS configuration. One example of such an algorithm takes into consideration the number of physical processors in the RDBMS, such that the total number of counters increases linearly with the number of processors. As indicated above, using multiple counters can reduce the occurrence of lost updates, which can occur when two or more processors (or more generally, two or more execution units) attempt simultaneous increments to the same counter. By using multiple counters and spreading the increment requests substantially evenly amongst them, the number of execution units which could attempt a simultaneous update to any single counter is minimized, thereby reducing the statistical probability of a lost update occurring.

The margin of error in the count of total fixes will be dependent on the frequency of lost updates, which depends on the ratio of counters to execution units. For most applications (including for example, the implementation of an embodiment of the present invention within a database product DB2® of IBM Corporation), negligible error is acceptable when the consumer is primarily interested with trends in the RDBMS activity level and not the accuracy of individual measurements. It should be noted that the level of accuracy can be configured by varying the number of counters. Note that increasing the number of counters (e.g. up to the number of active execution units) has the benefit of reducing the error at the expense of increasing the memory and computational cost of aggregating the counters.

Execution units will be continually created and destroyed as part of the normal operation of an RDBMS. As part of the initialization of an execution unit, each execution unit can be associated with a counter in buffer 122 in accordance with an embodiment of the present invention. In one embodiment of the present invention, this is facilitated by assigning the address in memory of a single counter to each execution unit. The counter identified by this address will increment each time the respective execution unit fixes a page in the bufferpool. The respective execution unit will store this address and use it throughout its lifetime. The unlatched counters (using the addresses assigned thereto) from buffer 122 are assigned to execution units in a circular round robin fashion as shown in FIG. 3, to ensure that the number of execution units that will operate on any single counter is minimized. A method of associating counters to execution units in an embodiment of the present invention is described below.

Figure 4:
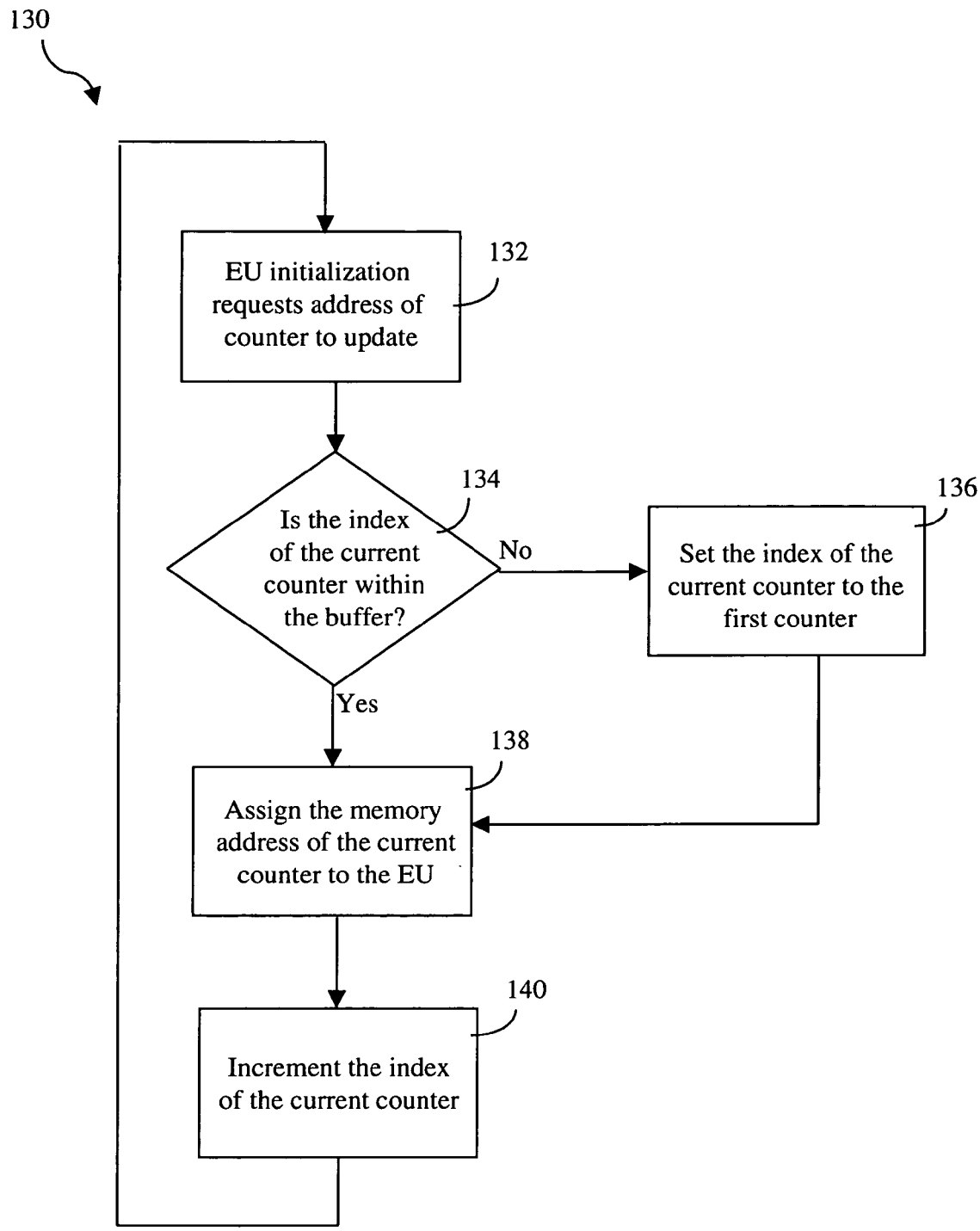
FIG. 4 is a flowchart illustrating steps in a method of associating counters to execution units in an embodiment of the present invention.

Referring to FIG. 4, a flowchart illustrating steps in a method of associating counters to execution units in an embodiment of the present invention is shown generally as 130.

At step 132, an execution unit (EU) requests an address of a counter to update during its operation. In this embodiment of the present invention, the address is requested at initialization, and stored for subsequent use by the respective counter.

At step 134, the value of an index of the current counter is retrieved, which denotes the address of the counter that is to be associated with the execution unit being initialized. If the value of the index does not correspond to a counter in the buffer (e.g. buffer 120 of FIG. 3), as would be the case if the last counter in the pool was most recently assigned to another execution unit for example, then the index of the current counter is set to identify the first counter of the buffer.

At step 136, the memory address of the current counter as denoted by the index is assigned to the execution unit being initialized. Accordingly, with a counter of the buffer having been associated with the execution unit, the corresponding counter will be incremented each time the execution unit performs a page fix operation. Assigning a counter to the execution unit in this manner is preferable to accessing the value of the index each time a page fix operation is performed, since multiple execution units attempting to access the index simultaneously will cause the same problems as if a single counter were used (i.e. performance delay if serialization of access to the index is enforced, and a greater potential for lost updates if serialization of access to the index was not enforced).

At step 138, the index is set to identify the next counter in the sequence of counters contained in the buffer.

The steps of method 130 are repeated for multiple initializations of execution units of the RDBMS.

In variant embodiments, an identifier associated with a counter other than a memory address may be employed. For example, a hashing algorithm for determining the appropriate counter based on some execution unit identifier could be used.

Figure 5:
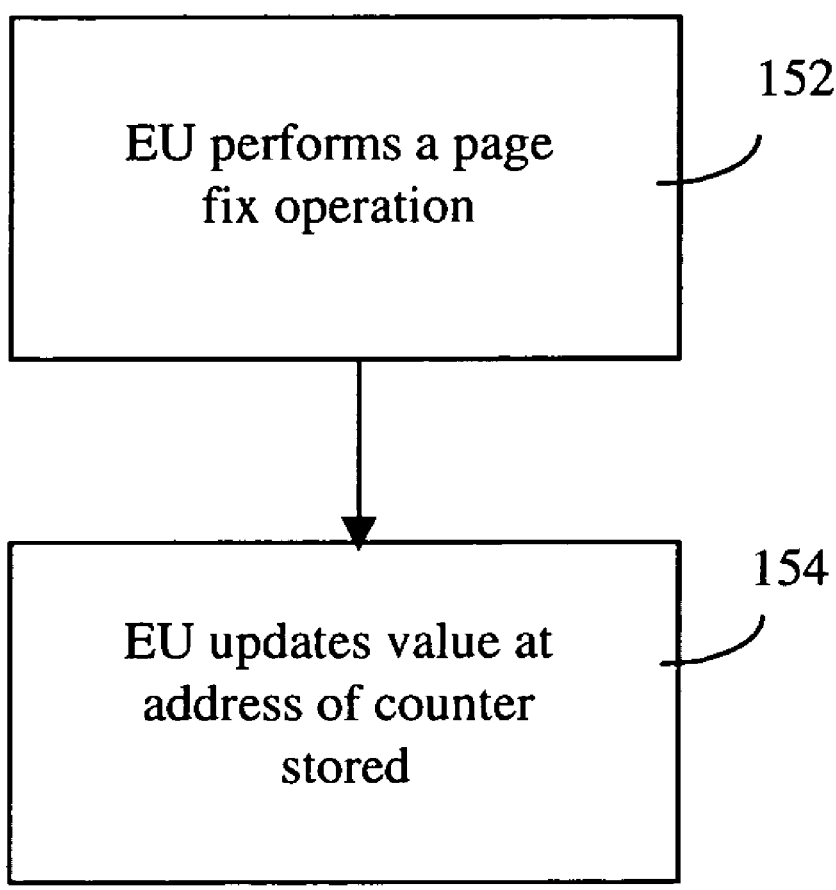
FIG. 5 is a flowchart illustrating steps in a method of incrementing counters when a page fix operation is performed in an embodiment of the present invention.

Referring to FIG. 5, a flowchart illustrating steps in a method of incrementing counters when a page fix operation is performed in an embodiment of the present invention is shown generally as 150.

The steps of method 150 are repeated for each execution unit instance in the RDBMS (e.g. RDBMS 10 of FIG. 1).

At step 152, the particular execution unit (EU) performs a page fix operation.

At step 154, the execution unit updates the value of the counter at the stored address of the counter associated with that execution unit, as described with reference to FIG. 4.

With respect to embodiments of the invention described with reference to FIGS. 3 through 5 in which a group of counters are employed, when the total number of page fix operations is required, this can be computed by calculating the total of all counters in the group. This sum may then be subsequently used to compute various measures of activity as desired, each of which is a function of the computed total (e.g. as described with reference to steps 112 through 116 of method 100 of FIG. 2).

Referring again to FIG. 3, the embodiment of the invention described therein shows only one counter present in a cache line size of memory. A cache line refers to the smallest unit of memory that can be transferred between main memory (e.g. the portion of memory 60 of FIG. 1 used as such) and the microprocessor's cache (e.g. memory cache 70 of FIG. 1).

Many multiprocessor systems try to maintain cache coherence (consistency) automatically. For example, if processor A writes to a counter before processor B attempts to write to a different counter on the same cache line, then processor Bs cache will be invalidated and it will be forced to reload the cache line from memory. This resolution is typically performed automatically by the hardware at the expense of bus bandwidth. This latency can be reduced by restricting each cache line to contain only a single counter. This is achieved by the well-known technique of "padding the counter", such that the sum of the size of the counter and the padding equals the size of the cache line on the hardware.

In some implementations, the cache related costs of updating a shared memory might be considered to be too excessive to incur with every page fix. For example, loading a counter into the cache incurs the cost of loading the counter's cache line from memory. Further cost will be incurred if a cache line must first be written to memory to make space for the counter's cache line. Yet further cost will be incurred if a heavily accessed cache line is to be replaced with the cache line for the counter implemented in accordance with an embodiment of the present invention, since this will force a reloading of the original cache line on the next access.

In one embodiment of the invention as will be described in further detail with reference to FIG. 6, a technique for reducing these costs is employed. In accordance with this technique, each execution unit updates the shared counter only after it has performed a specific number of page fixes. In one example implementation, an integer value representing a local counter is stored, along with an address of the shared counter associated with each execution unit to be updated (e.g. as described with reference to FIG. 4). Each time a page fix occurs, the local counter is updated. Only after a specified number of increments to the local counter is the shared counter updated.

Figure 6:
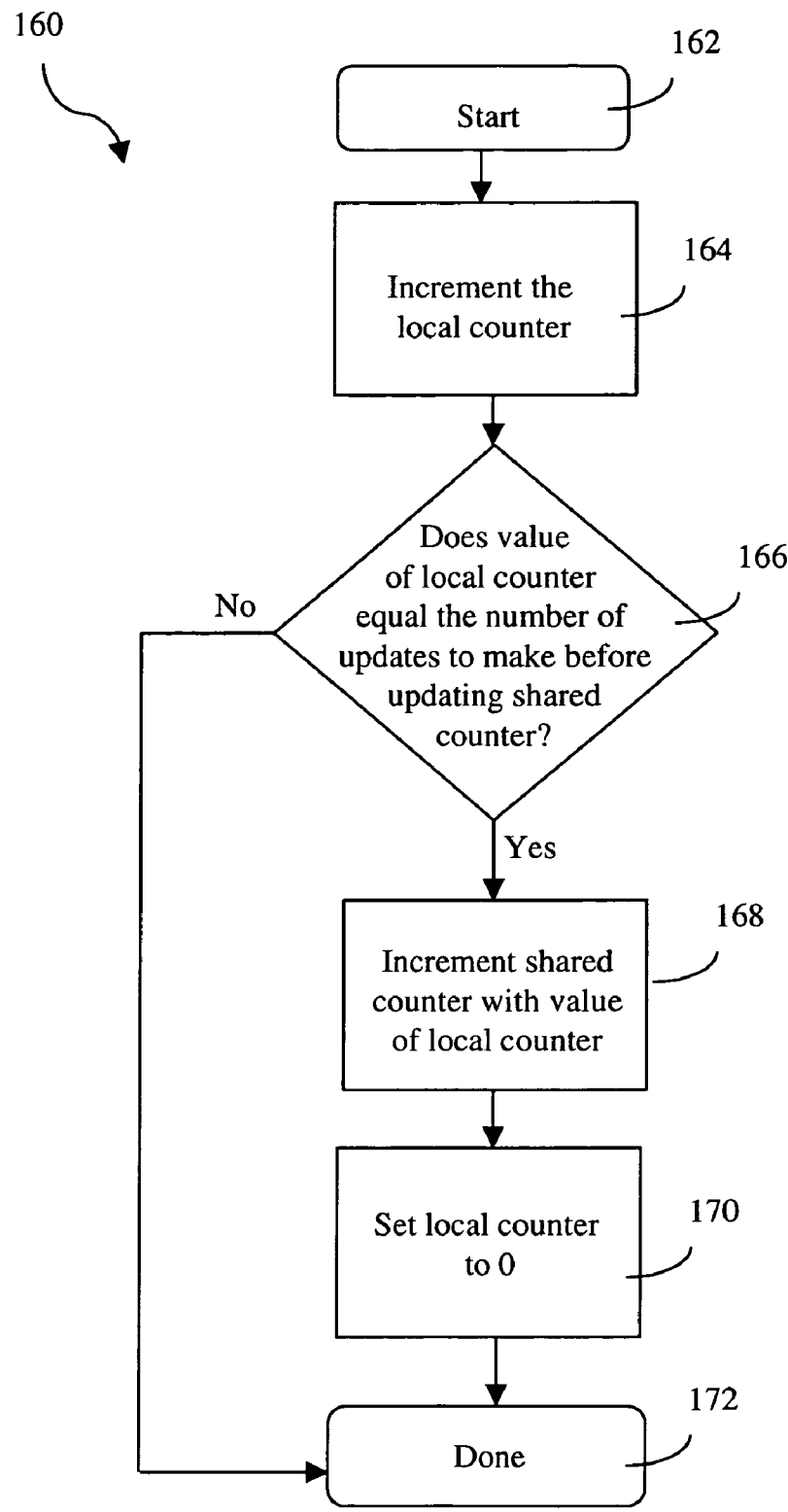
FIG. 6 is a flowchart illustrating steps in a method of incrementing counters when a page fix operation is performed in an embodiment of the present invention where local counters are used.

Referring to FIG. 6, a flowchart illustrating steps in a method of incrementing counters when a page fix operation is performed in an embodiment of the present invention where local counters are used is shown generally as 160, and commences at step 162.

At step 164, a local counter associated with an execution unit is incremented when the execution unit performs a page fix operation (e.g. at step 142 of FIG. 5).

At step 166, a check is made to determine if the value of the local counter equals or otherwise attains the pre-determined value representing the number of increments or updates that are to be made before the shared counter associated with the execution unit is updated. If so, the flow of method steps proceeds to step 168, where the shared counter is incremented with the value of the local counter. Subsequently, the local counter is reset (e.g. to 0) at step 170.

The steps of method 160 repeats every time a page fix operation is performed by an execution unit that has a local counter associated with it.

Care must be taken in selecting the pre-determined number of increments to make locally before the shared counter is updated, in order to ensure that the shared counters reflect the total number of fixes at any point in time within a reasonable degree of accuracy.

It will be understood by persons skilled in the art that in implementations where local counters are used as described herein, it is not necessary that each and every execution unit be associated with a local counter.

In certain implementations of an embodiment of the present invention, activity level monitoring may only be required for a subset of execution units in the system. In some implementations, applications may wish to selectively designate execution units whose page fixes will not be considered in calculating a page fix rate for the system.

For example, it may be desirable to exclude an execution unit's count of page fixes when calculating a page fix rate for an autonomic control system used to limit the impact of one or more maintenance utilities on the production workload. In this example, the control system can make decisions on how aggressively to run the utility based on the page fix rate. However, the actual impact of the utility on the production system will be indistinguishable if both the utility and the workload generate page fixes. One solution is to exempt the utility from reporting page fixes. Accordingly, in a variant embodiment of the invention, specific execution units may be selected for which the counting of page fixes for those execution units are to be performed. In this manner, an execution unit can be subscribed to or unsubscribed from the counting of page fixes for that execution unit, when desired.

The inventors have observed that the requirement for controlling which execution units are permitted to affect the computed activity level could not have be easily accomplished with a metric such as CPU or IO utilization. In those cases, the metrics are typically tracked by the operating system for all threads/processes in the RDBMS of the system.

The embodiment is directed to a low-overhead system for gauging the activity level of an RDBMS, achieved through counting page fixes. The technique of substantially evenly distributing increments over a set of counters as an alternative to serialized incrementing of a single counter has application to software systems other then RDBMS. For example, it may be applied within an operating system for counting the number of I/O requests. In another application, it can be used for counting the number of packets serviced on a network switch. In general, it is applicable to any system where it may be desirable to gauge the activity of a set of execution units without incurring significant performance overhead.

Instructions for performing a method in accordance with an embodiment of the present invention or any part thereof may be provided on computer-readable media. Such computer-readable media is also intended to include network transmission media.

In particular, instructions for performing a method in accordance with an embodiment of the present invention may be provided in the form of an activity level assessment system, for execution by a database management system (e.g. RDBMS 10 of FIG. 1). In one implementation, the activity level assessment system comprises one or more control modules programmed to perform the various steps of the respective method. The activity level assessment system can also include a number of system modules programmed to establish, in memory (e.g. at setup), a buffer to store a group of counters (e.g. as described with reference to FIG. 3) and an index for storing a memory address or other identifier associated with a counter.

It will also be understood by persons skilled in the art that the various modules may be implemented through one or more software modules, in various software formats and based on various programming languages in variant implementations of the activity level assessment system.

The present embodiments have been described. However, it will be understood by persons skilled in the art that a number of other variations and modifications are possible without departing from the scope of the invention as defined in the appended claims.

The invention claimed is:

1. A method of assessing the activity level of a database management system, comprising the steps of:
   counting the number of page fix operations performed by at least one execution unit of the database management system; and
   computing an activity measure for the database management system;
   wherein the activity measure is a function of the number of page fix operations counted at the counting step.

2. The method of claim 1, wherein the activity measure is used as the sole indicator of activity level for the database management system.

3. The method of claim 1, wherein the counting step comprises incrementing one of a plurality of counters in response to each of a plurality of increment requests, wherein an increment request is made at an instance where a page fix operation is performed by one of the execution units.

4. The method of claim 3, wherein a local counter associated with one or more execution units of the at least one execution unit are incremented in the incrementing step, wherein the method further comprises the step of updating a shared counter associated with the one or more execution units when the respective local counter attains a predetermined value, and wherein the activity measure is based on the value of one or more shared counters associated with the at least one execution unit.

5. The method of claim 3, wherein the increment requests are distributed substantially evenly over the plurality of counters.

6. The method of claim 3, further comprising the step of associating a counter with at least one execution unit, such that when each of the at least one execution unit performs a page fix operation, the counter associated with the respective execution unit is incremented at the counting step.

7. The method of claim 6, further comprising the step of selecting one or more execution units from the at least one execution unit, such that the activity measure is based on the value of one or more counters associated with the selected execution units.

8. The method of claim 6, wherein counters are associated with execution units in the associating step in a circular, round robin fashion.

9. An activity level assessment system for assessing the activity of a database management system, the activity level assessment system comprising:
   at least one control module programmed with instructions which are executable by the database management system, the at least one control module being programmed to count the number of page fix operations performed by at least one execution unit of the database management system and compute an activity measure for the database management system;
   wherein the activity measure is a function of the number of page fix operations counted.

10. The system of claim 9, wherein the activity measure is used as the sole indicator of activity level for the database management system.

11. The system of claim 9, further comprising a system module programmed to establish a plurality of counters for association with the at least one execution unit in a memory of the database management system.

12. The system of claim 11, wherein the plurality of counters comprise at least one local counter and at least one shared counter, and wherein the activity measure is based on the value of one or more the shared counters.

13. The system of claim 11, wherein the number of established counters has been determined to be optimal for the number of processors within the database management system.

14. The system of claim 11, wherein the memory comprises a plurality of cache lines, each of which contains exactly one counter.

15. The system of claim 11, wherein the system module is further programmed to establish at least one index for storing a memory address associated with one of the plurality of counters, for use in associating counters to execution units.

16. The system of claim 11, wherein the activity measure is based on the value of one or more counters associated with one or more execution units selected from the at least one execution unit.

17. A computer program product comprising a computer-readable medium tangibly embodying computer executable code for directing a data processing system to perform a method of assessing the activity level of a database management system, the computer program product further comprising:
   code for counting the number of page fix operations performed by at least one execution unit of the database management system; and
   code for computing an activity measure for the database management system;
   wherein the activity measure is a function of the number of page fix operations counted at the counting step.

18. The computer program product of claim 17, wherein the activity measure is used as the sole indicator of activity level for the database management system.

19. The computer program product of claim 17, wherein the counting step comprises incrementing one of a plurality of counters in response to each of a plurality of increment requests, wherein an increment request is made at an instance where a page fix operation is performed by one of the execution units.

20. The computer program product of claim 19, wherein a local counter associated with one or more execution units of the at least one execution unit are incremented in the incrementing step, wherein the method further comprises the step of updating a shared counter associated with the one or more execution units when the respective local counter attains a predetermined value, and wherein the activity measure is based on the value of one or more shared counters associated with the at least one execution unit.

21. The computer program product of claim 19, wherein the increment requests are distributed substantially evenly over the plurality of counters.

22. The computer program product of claim 19, further comprising the step of associating a counter with at least one execution unit, such that when each of the at least one execution unit performs a page fix operation, the counter associated with the respective execution unit is incremented at the counting step.

23. The computer program product of claim 22, further comprising the step of selecting one or more execution units from the at least one execution unit, such that the activity measure is based on the value of one or more counters associated with the selected execution units.

24. The computer program product of claim 22, wherein counters are associated with execution units in the associating step in a circular, round robin fashion.

* * * * *